(12) United States Patent
Frauen et al.

(10) Patent No.: US 8,765,042 B2
(45) Date of Patent: Jul. 1, 2014

(54) FUSELAGE SECTION OF AN AIRCRAFT AND METHOD FOR THE PRODUCTION OF THE FUSELAGE SECTION

(75) Inventors: Holger Frauen, Hamburg (DE); Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 390 days.

(21) Appl. No.: 13/154,899

(22) Filed: Jun. 7, 2011

(65) Prior Publication Data

US 2011/0303791 A1 Dec. 15, 2011

Related U.S. Application Data

(60) Provisional application No. 61/353,689, filed on Jun. 11, 2010.

(51) Int. Cl.
*B32B 37/16* (2006.01)
*B29C 70/30* (2006.01)
*B64C 1/00* (2006.01)

(52) U.S. Cl.
USPC ............ 264/258; 156/242; 244/119; 244/133

(58) Field of Classification Search
USPC .................. 156/169, 173, 175, 242; 264/258; 244/119, 120, 133
See application file for complete search history.

(56) References Cited

U.S. PATENT DOCUMENTS

| 3,946,127 A * | 3/1976 | Eisenmann et al. ............ 428/48 |
| 6,114,050 A * | 9/2000 | Westre et al. ................. 428/608 |
| 7,261,786 B2 * | 8/2007 | Druckman et al. ........... 156/173 |
| 2004/0188025 A1 * | 9/2004 | Anderson et al. ............. 156/382 |

FOREIGN PATENT DOCUMENTS

| DE | 19809264 A1 | 9/1999 |
| DE | 10309806 A1 | 10/2003 |
| DE | 102007048003 A1 | 4/2009 |
| WO | WO 2010/104741 A1 | 9/2010 |

* cited by examiner

*Primary Examiner* — Rob Swiatek
(74) *Attorney, Agent, or Firm* — Hoffmann & Baron, LLP

(57) ABSTRACT

In accordance with the method, an inside layer of a fuselage section skin made from first fibers is placed on a manufacturing surface, the first fibers being placed in one or more first fiber directions. On the inside layer, a stiffening structure is formed from stiffening fibers, the stiffening fibers being placed in one or more stiffening fiber directions. An outside layer of the fuselage section skin, comprising fourth fibers, is placed on the stiffening structure formed from stiffening fibers, the fourth fibers being placed in one or more fourth fiber directions. The stiffening structure is designed and developed in such a way that the fuselage section does not require an additional stiffening structure, is connected with the fuselage section skin, and comprises the inside layer, the stiffening structure, and the outside layer; in particular, an additional stiffening structure in the form of stringers and frames is not required.

15 Claims, 2 Drawing Sheets

FUSELAGE SECTION OF AN AIRCRAFT AND METHOD FOR THE PRODUCTION OF THE FUSELAGE SECTION

CROSS REFERENCE TO RELATED APPLICATION

This application claims priority to U.S. Provisional Application No. 61/353,689 filed on Jun. 11, 2010, which is incorporated herein by reference in its entirety.

BACKGROUND

1. Field

This application relates to a fuselage section of an aircraft, in particular a hollow cylinder-shaped or barrel-shaped, stringerless and ribless fuselage section of an aircraft, and to a method of producing the fuselage section from fiber composite materials.

2. Brief Discussion of Related Art

It is generally known that a fuselage of an aircraft can be produced by joining a plurality of pre-manufactured fuselage sections. Fuselage sections of this type typically comprise an outer skin and stiffening elements that are connected to the inner surface of the outer skin. The structural stability required of a fuselage section is achieved through the interaction of the composite structure of outer skin and stiffening elements. The stiffening elements traditionally used are "stringers" and "ribs". Stringers are reinforcement elements which are oriented along a longitudinal axis of the aircraft and which serve to increase the flexural stiffness of the fuselage section. Ribs are reinforcement elements which are oriented perpendicular to the longitudinal axis of the aircraft and which serve to increase the torsional stiffness of the fuselage section. Therefore, since the outer skin also contributes to the structural stiffness, it must have a certain thickness.

Traditionally, fuselage sections are made of light metal, such as aluminum, or light metal alloys. The manufacturing methods used and thus the fuselage sections ultimately produced are based on the known methods of production used in metalworking.

Since the stiffening elements are traditionally disposed almost exclusively on the inner surface of the outer skin and, depending on the construction, typically have a depth of 5-25 cm, these elements require considerable installation space and ultimately reduce the usable cabin diameter inside the fuselage section.

The use of composite materials in the production of aircraft components, for example, fuselage sections, entails significant and generally known advantages over the materials and manufacturing methods previously used in the construction of aircraft.

Thus, US 2007/0095982 A1 discloses a barrel-shaped stringerless fuselage section of an aircraft (a so-called "single piece fuselage barrel") and a method of producing it from fiber composite materials. In a first step of the method disclosed therein, a cylinder-shaped construction molded body is used. The construction molded body has a longitudinal axis and a surface which has depressions (recesses). The depressions are oriented in particular perpendicular to the longitudinal axis and designed so as to run circumferentially around the construction molded body. In a second step, resin-impregnated first fibers are incorporated into the depressions. In the course of the production process, these fibers form a stiffening structure. In a third step, second fibers are applied to the surface of the construction molded body and to the depressions filled with the first fibers, which second fibers form an outer skin of the fuselage section, with the first fibers being applied in a fiber orientation different from the fiber orientation or orientations in which the second fibers are applied. In a fourth step, all of the integrated fibers are joined to one another by means of a curing process. Finally, the construction mold body is separated from the cured fuselage section. The disadvantage of this method is that the fuselage section produced still has stiffening structures that project into the inside volume of the fuselage section.

SUMMARY

The problem to be solved by the present application is to make available a fuselage section of an aircraft and a method of producing the fuselage element from fiber composite materials which eliminates the disadvantage of stiffening structures that project into the inside volume of the fuselage section.

A first aspect of the problem is solved by a method with the features of claim 1 and a second aspect of the problem is solved by a fuselage section with the features of claim 10. Advanced embodiments and designs are the subject matter of the dependent claims. Other features, applications and advantages follow from the description below and from the explanation of the practical examples that are shown in the figures.

The first aspect of the problem is solved by a method of producing a fuselage section of an aircraft from fiber composite materials, with the fuselage section having a fuselage section skin with an outside surface, an inside surface and a skin thickness D, with a construction mold with a construction mold surface being used to create a fuselage section skin with an integral stiffening structure, with resin-impregnated fibers being applied in fiber different orientations to the surface of the construction mold, with the fiber orientation of the fibers that form the stiffening structure being different from the fiber orientations of the other fibers, with all of the fibers applied to the construction mold being joined to one another by means of a curing process, and with the construction mold being separated after conclusion of the curing process.

The fuselage section to be produced can have practically any shape. Preferably, however, the fuselage section has the form of a hollow cylinder or the form of a barrel.

The construction mold used is a support structure with a construction mold surface to which the impregnated fibers are applied in different fiber orientations. The shape of the construction mold surface is such that it corresponds to a negative shape of the desired shape of the inside surface of the fuselage section. When producing a fuselage section in the shape of a hollow cylinder, the construction mold surface preferably has the shape of a cylinder, and in contrast to the document US 2007/0095982 A1 mentioned above, it does not have depressions/recesses incorporated into it. After conclusion of the curing process, for example, in an autoclave, the construction mold is separated from the cured fuselage section.

In the prior art, the resin-impregnated fibers applied to the construction mold are known, for example, as so-called "prepregs" (acronym for "PRE-imPREGnated sheet materials"). Also known are methods for incorporating fibers, for example, tape laying and tape winding. Additional and more detailed information can be found in the relevant state of the art.

The fibers of the fiber composite or composites are preferably unidirectional rovings (fiber bundles or fiber strands), for example, glass fibers (in GFRP), carbon fibers (in CFRP) or aramide fibers. The rovings preferably have a Tex number higher than 3 k (3 k=3,000 filaments). The fiber composite materials are preferably CFRP, GFRP, hybrid fiber metal composites or a mixture of the above.

The method is characterized in that a continuous full-surface inner layer of the fuselage section skin, which inner layer comprises first fibers, is applied to the construction mold surface, with the first fibers being oriented in one or more first fiber orientations, that the stiffening structure of stiffening fibers is formed on the inner layer, with the stiffening fibers being applied so as to be oriented in one or more stiffening fiber orientations, and that a continuous full-surface outer layer of the fuselage section skin, which outer layer comprises the fourth fibers, is applied to the stiffening structure formed by the stiffening fibers, with the fourth fibers being applied so as to be oriented in one or more fourth fiber orientations.

Due to the fact that the stiffening structure is disposed between the inner layer and the outer layer, the inside surface of the fuselage section is formed by a surface of the inner layer. This inside surface preferably does not have any elevations that project into the inside space of the fuselage section so that the entire inside cross section of the fuselage section is available for cabin use. Specifically, in contrast to US 2007/0095982 A1, no elements of a stiffening structure project into the inside volume of a barrel-shaped fuselage section.

Incorporating the stiffening structure between the inner layer and the outer layer furthermore ensures that the stiffening structure is protected against direct mechanical effects. Thus, the forces arising due to mechanical effects, for example, bird strike, hail strike, stone strike (collectively, "foreign object impact") on the outer surface or on the inner surface are transferred to and distributed across the stiffening structure.

The first fibers, the stiffening fibers and the fourth fibers can be made of identical or different fiber composite materials. It is preferable to use the fiber composite materials mentioned above. To ensure adequate flexural stiffness and torsional stiffness in the fuselage section while at the same time keeping the weight as low as possible, the stiffening fibers are applied in one or more fiber orientations which differ from the fiber orientations in which the first and fourth fibers are applied.

An especially preferred advanced embodiment is characterized in that the stiffening fibers comprise the second and third fibers, with the second and third fibers being applied in a second and third fiber orientation so as to be oriented on top of one another in such a manner that all second and third fibers form a lattice with lattice points that are identical to points of intersection between the second and third fibers, with the lattice applied being described by the following lattice parameters: the first lattice length $l_1$, the second lattice length $l_2$ and a lattice angle $\alpha$.

It is obvious that the stiffening structure formed on the inner layer can basically have any shape; however, for the sake of simple forces modeling as part of production planning and for the sake of production ease, it is preferable to use a lattice structure as the stiffening structure.

The term lattice or lattice structure is defined as a two-dimensional pattern which can be clearly described by the following lattice parameters: the first lattice length $l_1$, the second lattice length $l_2$ and a lattice angle $\alpha$. Even though, due to the arrangement of the second and third fibers on top of one another, the second and third fibers actually have a three-dimensional component, this component will be ignored within this context. Thus, the term lattice here refers to the lattice pattern that can be seen from a hypothetical top view onto all of the integrated second and third fibers.

A preferred advanced embodiment of the method is characterized in that the second and third fibers that form the lattice are applied to the inner layer in such a manner that the lattice angle $\alpha$ is greater than 0° and smaller than or identical to 90° or is within a range from 30-60° or measures 45°. In addition, the second and third fibers that form the lattice are preferably applied to the inner layer in such a manner that the first and the second lattice length $l_1$, $l_2$ measures 5-150 cm, in particular 15-75 cm, i.e., $l_1, l_2 \in (15\,cm, \ldots, 75\,cm)$. Thus, the lattice can have a rectangular or a rhomboid shape. It is obvious that the lattice parameters can be adjusted to meet the actual requirement. The lattice parameters are preferably constant for the entire lattice, thus ensuring a uniform lattice or rhombus pattern.

In a preferred advanced embodiment of the method, the second and third fibers that form the lattice are applied in such a way that the lattice parameters vary in a locally predeterminable manner. This can be useful to provide areas of the fuselage section, of which it is known that they will be subjected to different mechanical loads, with a suitably adapted reinforcement structure.

After the inner layer has been applied to the construction mold, the reinforcement structure is formed on top of it. This is preferably accomplished by applying the second and third fibers. To this end, several possible approaches can be used.

According to the first approach, exclusively the second and third fibers are disposed between the inner layer and the outer layer. Since these second and third fibers are applied on top of one another in a lattice-like structure, the surface that forms on top of the continuous full-surface, i.e., cohesive, uninterrupted, inner layer is a structured surface which has second and third fibers that extend only between the lattice points of the lattice as well as second and third fibers that are stacked on top of one another at the points of intersection, while the full-surface regions in between still allow the surface of the inner layer to be seen. Within the lattice structure, the second and third fibers can be disposed on top of one another in several layers with alternating fibers or in two layers that are disposed on top of each other and that contain only the first or second fibers.

According to a second approach, in order to form the stiffening structure, the second, third and fourth fibers are applied in a predetermined sequence. Thus, in the lattice structure, a layer comprising the fourth fibers can be applied on top of a layer comprising the second fibers before a layer comprising the third fibers is applied. By incorporating the fourth fibers into the construction of the stiffening structure, it is possible, in particular, to adjust the stiffness of the stiffening structure and it is furthermore possible to adjust the distribution of the forces introduced from the outside into the fuselage section. The person skilled in the art can use his knowledge to identify the many possible variations in the fiber sequence and the effects the fiber sequences entail.

According to a third approach, in order to form the stiffening structure, the second, third and fourth fibers are applied to the inner layer, with the fiber density of the second and third fibers differing along the skin thickness D of the fuselage section skin and being highest in the region of one half of the skin thickness D/2.

The second and third fibers are preferably applied in the form of a fiberwoven fabric with a fabric width of 1-50 cm, in particular 5-25 cm. Since the second and third fibers are disposed on top of one another in the form of a lattice, the fabric width also defines the width of the longitudinal lattice elements that connect the lattice points to one another.

To ensure a more rapid production of a solid fuselage element, it is preferable to apply the first, second, third and fourth fibers as fiberwoven fabrics, wherein a fabric width of the fiberwoven fabric of the first and/or fourth fibers is greater than a fabric width of the fiberwoven fabrics of the second and third fibers.

The method leads to the production of a fuselage section in many different embodiments, the fuselage section having a fuselage section skin thickness D which is greatest in the region of the points of intersection between the second and third fibers, i.e., at the lattice points, and lowest in the region of a geometric mean of the lattice faces generated between the lattice points. Specifically, the method typically leads to an outer surface of the fuselage section, which outer surface, after conclusion of the curing process, has concave structures.

The second aspect of the problem is solved by an aircraft fuselage section comprising fiber composite materials, with the fuselage section having a fuselage section skin with an outer surface, an inner surface, a skin thickness D and an integral stiffening structure, with the fuselage section skin having fibers that are oriented in different fiber orientations, with the fiber orientations of the fibers that form the stiffening structure being different from the fiber orientations of the other fibers. The fuselage section is characterized in that the fuselage section skin comprises a continuous full-surface inner layer comprising the first fibers with one or more first fiber orientations and forming the inside surface, and a continuous full-surface outer layer comprising the fourth fibers with one or more fourth fiber orientations and forming the outside surface, and that the stiffening structure is disposed between the inner layer and the outer layer and is formed by stiffening fibers, with the stiffening fibers being oriented in one or more stiffening fiber orientations.

An especially useful advanced embodiment of the fuselage section is characterized in that the stiffening fibers are made of the second and third fibers, with the second and third fibers being disposed on top of one another so as to be oriented in a second and third fiber orientation, and that all of the second and third fibers form a lattice with lattice points that are identical to the points of intersection between the second and third fibers, with the lattice being described by the following lattice parameters: the first lattice length $l_1$, the second lattice length $l_2$ and a lattice angle $\alpha$.

The fuselage section is further characterized by another useful feature in that the skin thickness D at the points of intersection between the second and third fibers is greater than in the areas between the points of intersection, which ultimately has the effect that the fuselage section skin has an outer surface comprising concave structures. The concave structures are formed especially in the geometric mean of the lattice faces generated by the lattice points.

Outer surfaces of an aircraft fuselage with this type of structure are able to noticeably reduce the air resistance of a flying aircraft, for example, by inducing a turbulent flow in the near-surface boundary layer. To this end, the dimensions of the concave structures and thus the arrangement of the lattice of the stiffening structure must be adapted to an air flow speed, for example, to the typical cruising speed, of the airplane involved and to local geometric requirements of the shape of the fuselage section.

The explanations given in the context of the method can, by analogy, be applied to the fuselage section.

Other advantages, features and details follow from the description below in which practical examples are explained in greater detail based on the figures. Described and/or visually represented features, separately or in any useful combination with one another, constitute inventive subject matter, optionally even independently of the claims, and, in particular, can also be the subject matter of one or more separate application(s). Identical, similar and/or functionally identical parts are identified by the same reference characters.

Accordingly, it possible to markedly reduce the skin thickness of fuselage sections in comparison with the stringerless and ribless fuselage sections known from the prior art. More specifically, the inside space of fuselage sections available for cabin fixtures is increased as compared to the inside space of the fuselage sections known from the prior art. The fuselage sections can be manufactured so as to have a lower weight and a higher flexural and torsional stiffness, which leads to higher cabin pressure differences and, as a result, to higher cruising altitudes and, ultimately, to a reduced fuel consumption. On the other hand, it is possible to provide the fuselage sections with the inside volume typically required today while reducing the outside diameter of the fuselage sections and the entire aircraft fuselage, which in turn leads to a reduction of the air resistance of the aircraft, to a reduction of weight, and thus to lower operating costs and ultimately to a reduction of the environmental impact.

DETAILED DESCRIPTION

Figure 1:
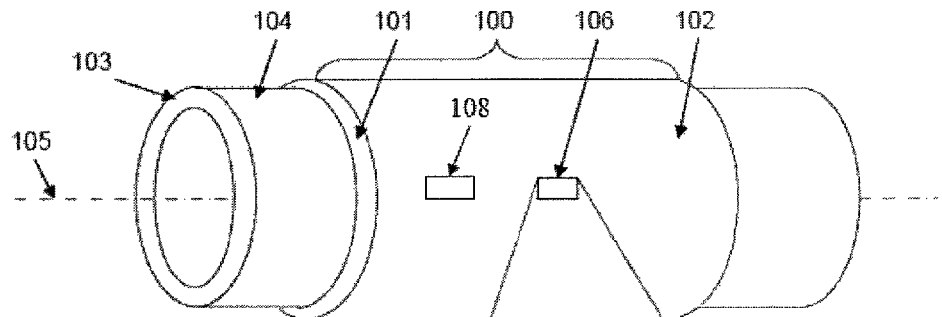
FIG. 1 shows a schematic representation of a hollow cylinder-shaped fuselage section of an aircraft formed on a construction mold.

FIG. 1 shows a schematic representation of a hollow cylinder-shaped fuselage section 100 of an aircraft with its fuselage section skin 101, which fuselage section has been applied to a construction mold 103 and has already been cured in an autoclave process. The construction mold 103 is a hollow cylinder with an unstructured construction mold surface 104. The construction mold, the fuselage section 100 and the fuselage section skin 101 have a common longitudinal axis 105.

To form the shown cured fuselage section skin 101 with an integral stiffening structure, resin-impregnated fibers are applied, so as to be oriented in different fiber orientations, to the construction mold surface 104 which currently has no depressions, with the fiber orientations of the fibers that form the stiffening structure being different from the fiber orientations of the other fibers. To this end, first a continuous full-surface inner layer 301 of the fuselage section skin 101, the inner layer comprising the first fibers, is applied to the construction mold surface 104, with the first fibers being applied in a first fiber orientation.

Figure 6A:
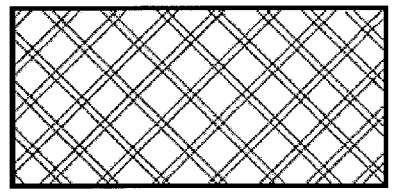
FIGS. 6a and 6b show hypothetical top views onto the lattice-shaped stiffening structures in which lattice parameters vary in a locally predeterminable manner.
Figure 6B:
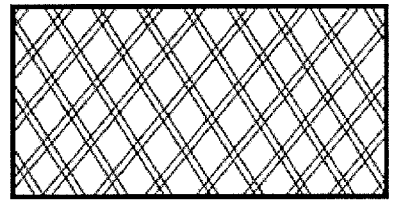

Next, the stiffening structure which comprises the second 201 and third 202 fibers is formed or created on the inner layer 301 in a segment 106 of the fuselage section skin 101, with the second 201 and third 202 fibers being applied on top of one another so as to be oriented in a second and third fiber orientation in such a manner that all of the second 201 and third 202 fibers form a lattice with lattice points which coincide with the points of intersection 203 between the second 201 and third 202 fibers, with the integrated lattice being described by the following lattice parameters: the first lattice length $l_1$, the second lattice length $l_2$ and a lattice angle α. In addition to the lattice parameters, another parameter which unambiguously defines the integrated lattice on the inner layer is an angle which encloses the direction of a lattice length $l_1$ or $l_2$ with the longitudinal axis. It can be useful to provide various segments of the fuselage section skin 101 that can be subjected to different mechanical loads. In this regard, the second 201 and third fibers 202 that form the lattice can be applied in such a way that the lattice parameters vary in a locally predeterminable manner, such as in segment 108 of the fuselage section skin 101. Examples of varied lattice parameters are shown in FIGS. 6a and 6b.

Subsequently, a continuous full-surface outer layer 302 of the fuselage section skin 101 comprising the fourth fibers is applied to the stiffening structure formed by the second and third fibers, with the fourth fibers being applied in a fourth fiber orientation. In the current practical example, exclusively the second and third fibers are disposed between the inner layer and the outer layer. After all fibers have been applied, all the fibers applied to the construction mold 103 are joined to one another by means of a curing process.

Figure 2:
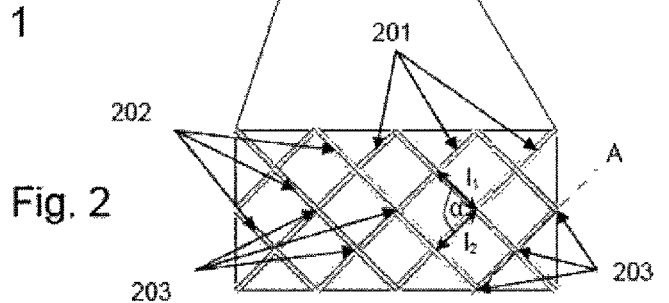
FIG. 2 shows a hypothetical top view onto the lattice-shaped schematic stiffening structure that has been applied to the inner layer.

FIG. 2 shows a hypothetical top schematic view onto the lattice-shaped stiffening structure which has been applied to the inner layer 301 in segment 106 of the fuselage section skin 101 and which comprises the second and third fiberwoven fabrics that are made from the second 201 and third fibers 202 and that are applied in the form of a lattice. The lattice points of the integrated lattice are identical to the points of intersection 203 between the second 201 and third 202 fibers. The figure shows the hypothetical situation without an integrated outer layer 302. The lattice parameters defining the lattice shape, i.e., the first lattice length $l_1$, the second lattice length $l_2$ and a lattice angle α, are visible in FIG. 2, as is a cross sectional plane A-A' which is relevant to FIGS. 3 to 5.

Figure 3:
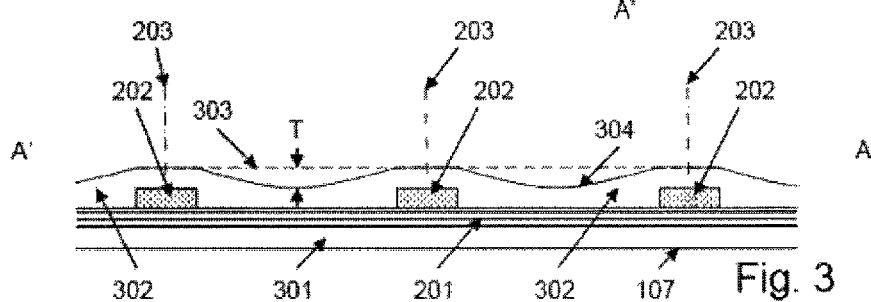
FIG. 3 shows a cross section along the sectional plane A-A' (see FIG. 2) through the fuselage section skin of a first practical example of the fuselage section.

FIG. 3 shows a cross section along the sectional plane A-A' (see FIG. 2) through the fuselage section skin 101 of a first practical example of a hollow cylinder-shaped fuselage section 100 which has already been cured in an autoclave process. In this practical example, first the second fibers 201 are applied in the form of fiberwoven fabrics arranged at a distance $l_1$ from and parallel to one another to the inner layer. Subsequently, the third fibers 202 are applied in the form of fiberwoven fabrics arranged at a distance $l_2$ from and parallel to one another. Finally, the fourth fibers are applied in the form of a continuous full-surface outer layer 302. As indicated by the elevations shown in FIG. 3, the skin thickness is greater at the points of intersection 203 between the second 201 and third 202 fibers than in the regions between the points of intersection 203, which results in an outside surface 102, 304 with concave structures. The depth of the structure is indicated by T.

Figure 4:
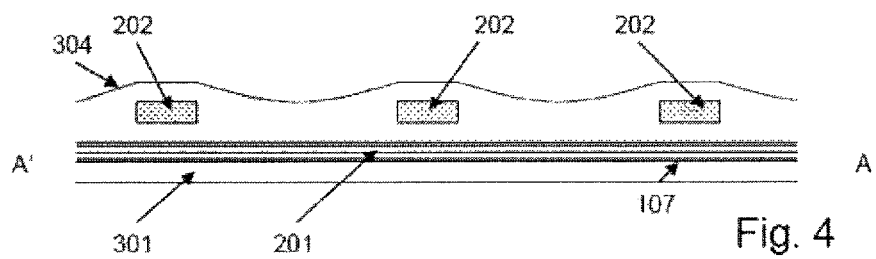
FIG. 4 shows a cross section along the sectional plane A-A' (see FIG. 2) through the fuselage section skin of a second practical example of the fuselage section.

FIG. 4 shows a cross section along the sectional plane A-A' (see FIG. 2) through the fuselage section skin 101 of a second practical example of the fuselage section 100. In contrast to FIG. 4, the reinforcement structure is formed by the second fibers 201, the fourth fibers 302 and the third fibers 202 before the outer layer comprising the fourth fibers 302 is applied.

Figure 5:
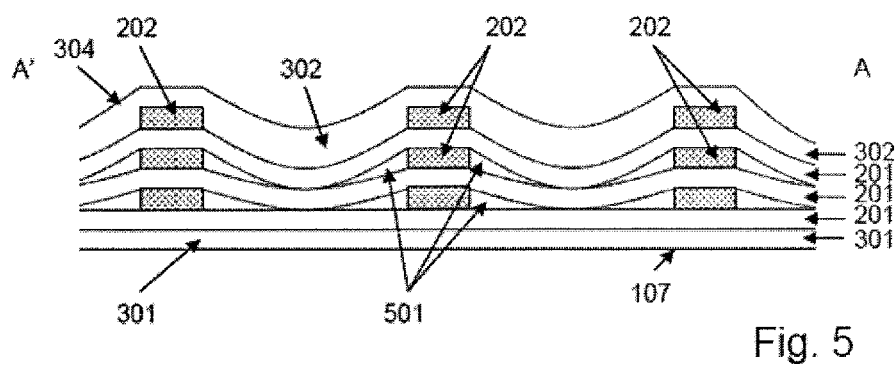
FIG. 5 shows a cross section along the sectional plane A-A' (see FIG. 2) through the fuselage section skin of a third practical example of the fuselage section.

FIG. 5 shows a cross section along the sectional plane A-A' (see FIG. 2) through the fuselage section skin 101 of a third practical example of the fuselage section 100. In this case, as in FIG. 3, exclusively the second 201 and third 202 fibers are disposed between the inner layer 301 and the outer layer 303, but in contrast to FIG. 3, alternating layers of a plurality of superjacent layers of these fibers are applied at the points of intersection 203. As the figure clearly shows, interstitial spaces 501 form at the points of intersection 203 between the second 201 and third 202 fibers, which interstitial spaces, for reasons of visualization, appear to be very large but in reality do not exist since, during the curing of the resin, they are closed by the resin adhering to the fibers. Because of the thicker layer of material at the point of intersection 203, the resultant outside surface 304 comprises concave structures.

FIGS. 6a and 6b show example lattices with parameters $l_1$, $l_2$ and α, which can be varied in a locally predeterminable manner, such as in segment 108 of the fuselage section skin 101. For example, FIG. 6a shows lengths $l_1$ and $l_2$ that are shorter than the length parameters in FIG. 2, while having the same lattice angle α as in FIG. 2. FIG. 6b shows the same lengths $l_1$ and $l_2$ as in FIG. 6a, while having a lattice angle α that is less that 90°, e.g., 60°. These and other variances of the parameters can be useful in providing segments of the fuselage section skin 101 that are reinforced in a locally predeterminable manner and suitable for different mechanical loads.

LIST OF REFERENCE CHARACTERS

100 Fuselage section
101 Fuselage section skin
102 Outside surface
103 Construction mold
104 Construction mold surface
105 Longitudinal axis
106 Segment of the fuselage section skin to which the stiffening structure (lattice) comprising the second and third fibers has been applied
107 Inside surface
108 Segment of the fuselage section skin with at least one lattice parameter varying in a locally predeterminable manner
201 Second fibers
202 Third fibers
203 Points of intersection between the second and the third fibers
301 Inner layer comprising the first fibers
302 Outer layer comprising the fourth fibers
303 Hypothetical unstructured surface
304 Outside surface with concave depressions
501 Interstitial spaces
T Concave depression
A-A' Sectional plane
α Lattice angle
$l_1$, $l_2$ Lattice lengths

The invention claimed is:

1. A method of manufacturing a fuselage section of an airplane comprising a fuselage section skin, the method comprising:
   placing an inside layer of the fuselage section skin comprising first fibers on a construction mold, the first fibers being placed in one or more first fiber directions;
   forming a stiffening structure comprising stiffening fibers on the inside layer, the stiffening fibers being placed in one or more stiffening fiber directions, the stiffening fibers comprising second fibers, or third fibers, or a combination of the second fibers and the third fibers;
   placing an outside layer of the fuselage section skin comprising fourth fibers on the stiffening structure, the fourth fibers being placed in one or more fourth fiber directions, wherein the stiffening fiber directions differ from the first fiber directions and the fourth fiber directions; and curing the inside layer, the stiffening structure and the outside layer to form the fuselage section comprising the fuselage section skin having a skin thickness D; and separating the fuselage section comprising the fuselage section skin from the construction mold.

2. The method as in claim 1, wherein the stiffening fibers comprise the second fibers and the third fibers, the method further comprising:

applying the second fibers and the third fibers on top of one another so as to form the stiffening structure that defines a lattice with lattice points that are identical to points of intersection between the second fibers and the third fibers, the lattice being described by lattice parameters including: a first lattice length $l_1$, a second lattice length $l_2$, and a lattice angle $\alpha$.

3. The method as in claim 2, wherein the second fibers and the third fibers are applied in such a way that the lattice angle $\alpha$ of the lattice is larger than 0° and smaller than or equal to 90°.

4. The method as in claim 2, wherein the second fibers and the third fibers are applied in such a manner that the first lattice length $l_1$ and the second lattice length $l_2$ of the lattice measure 5 cm-150 cm.

5. The method as in claim 2, wherein the second fibers and third fibers of the lattice are applied in such a manner that at least one lattice parameter varies in a locally predeterminable manner.

6. The method as in claim 2, wherein the second fibers, the third fibers and the fourth fibers are applied in a predetermined sequence to the inside layer.

7. The method as in claim 2, wherein the second fibers, the third fibers and the fourth fibers are applied to the inside layer with fiber density of the second fibers and the third fibers varying along the skin thickness D and being highest in a region of one half of the skin thickness D/2.

8. The method as in claim 2, wherein the second fibers and the third fibers are applied in a form of a fiberwoven fabric.

9. The method as in claim 8, wherein the first fibers and the fourth fibers are applied in a form of fiberwoven fabrics, with a fabric width of at least one of a fiberwoven fabric of the first fibers and a fiberwoven fabric of the fourth fibers being greater than a fabric width of the fiberwoven fabric of the second fibers and the third fibers.

10. The method as in claim 8, wherein a width of the fiberwoven fabric is 1 cm-50 cm.

11. The method as in claim 8, wherein a width of the fiberwoven fabric is 5 cm-25 cm.

12. The method as in claim 2, wherein the second fibers and the third fibers are applied in such a way that the lattice angle $\alpha$ is in the range of 30°-60°.

13. The method as in claim 2, wherein the second fibers and the third fibers are applied in such a way that the lattice angle $\alpha$ is 45°.

14. The method as in claim 2, wherein the second fibers and the third fibers that are applied in such a manner that the first lattice length $l_1$ and the second lattice length $l_2$ of the lattice measure 15 cm-75 cm.

15. The method as in claim 1, wherein an outer surface of the fuselage section skin comprises concave depressions.

* * * * *